United States Patent [19]

Loock

[11] 4,159,203

[45] Jun. 26, 1979

[54] AQUEOUS BLACK INK AND PROCESS FOR THE PRODUCTION THEREOF

[75] Inventor: Ehrenfried Loock, Wilhelmshaven, Fed. Rep. of Germany

[73] Assignee: Olympia Werke AG, Wilhelmshaven, Fed. Rep. of Germany

[21] Appl. No.: 938,869

[22] Filed: Sep. 1, 1978

[30] Foreign Application Priority Data

Sep. 3, 1977 [DE] Fed. Rep. of Germany ........... 2739784

[51] Int. Cl.$^2$ .................... C09D 11/00; C09D 11/02; C09D 11/16
[52] U.S. Cl. ........................................ 106/22; 106/20
[58] Field of Search .................................. 106/22, 20

[56] References Cited

U.S. PATENT DOCUMENTS

| | | | |
|---|---|---|---|
| 1,787,233 | 12/1930 | Bivins | 106/22 X |
| 3,519,443 | 7/1970 | Kaplan et al. | 106/22 |
| 3,705,045 | 12/1972 | Nadolski | 106/22 |
| 4,101,329 | 7/1978 | Loock | 106/22 |

FOREIGN PATENT DOCUMENTS

| | | |
|---|---|---|
| 2132324 | 1/1972 | Fed. Rep. of Germany. |
| 2160475 | 6/1972 | Fed. Rep. of Germany. |
| 2164614 | 9/1973 | Fed. Rep. of Germany. |
| 2210512 | 9/1973 | Fed. Rep. of Germany. |
| 2511902 | 3/1977 | Fed. Rep. of Germany. |

*Primary Examiner*—Carman J. Seccuro
*Attorney, Agent, or Firm*—Spencer & Kaye

[57] ABSTRACT

An aqueous black ink for a writing process in which ink is transferred in droplets onto a print carrier. The ink comprises 25–42 g./l. of the direct Diamine Blue 6B, extra high concentration; 14–22 g./l. of the direct dye Diamine Scarlet 4BS, extra concentration; 290–430 ml./l. of formamide; 32–48 ml./l. of 90% diethanolamine, 24–60 g./l. of citric acid, a water-soluble and organic soluble disinfectant, and balance essentially water. A process for producing such an ink comprises the steps of mixing both dyes together; introducing the mixture at room temperature in incremental portions into the formamide and stirring until the dyes are substantially completely dissolved. Undissolved salts are removed from the mixture. Diethanolamine and distilled water are introduced under agitation into the mixture. The pH is adjusted to about 6 to 8 with citric acid and disinfectant is added. The mixture is filtered under vacuum and then gases are withdrawn by treating the mixture under a vacuum.

12 Claims, No Drawings

AQUEOUS BLACK INK AND PROCESS FOR THE PRODUCTION THEREOF

BACKGROUND OF THE INVENTION

The present invention relates to novel inks, more particularly, to aqueous black inks which can be transferred in droplets onto a print carrier, and to processes for their production and use.

German Auslegeschrift No. 2,164,614, and DOS 2,210,512, incorporated herein by reference, for example, disclose ink ejection processes in which temporary pressures are produced in an ejection or writing head leading to the discharge of ink from capillary nozzles and to interruption of this ink flow to form droplets. In this process, the ink separates in droplets from the nozzle outlet area.

In order for an ink to be suitable for such ejection processes, certain parameters must be present. Thus, clean type characters require, among other things, uniformly sized ink drops which are to be applied in a grid pattern onto the print carrier. The production of ink drops of uniform size depends, on the one hand, on the geometry of the nozzle and the configuration of the break-off plane and, on the other hand, on ink having satisfactory wetting behavior within and/or outside the nozzles. To stabilize the ink meniscus in the nozzles and for the droplet formation, the ink requires a surface tension as high as possible.

The supply of ink into the nozzles of the ejection head, for example, from an ink reservoir, is effected, in part, through capillaries, often without pressure for the replenishment of the ink. In order to attain a flow of ink in sufficient amounts to achieve a high droplet sequence, and thus a high ejection speed, the ink must also have a low viscosity, e.g., about 1.70 centipoises.

The selection of suitable inks is limited, on the one hand, by its drying or thickening behavior. When the ejection system is at rest, ink components must not crystallize out in the area of the ejection head after long periods of inactivity. Similarly, during these rest periods, the ink ingredients must not colloidly segregate from the ink to form deposits. On the other hand, no surface film must form at the nozzle opening as a result of the evaporation of water.

To render ink ejection processes more economical, the writing head can consist of individual and nickel-plated steel laminae which are bonded together by the diffusion welding method into a composite writing head. The ink should not attack steel (e.g. "Nirosta," a stainless steel with a high chromium content) or, especially, the intermediate diffusion layers. The danger of pitting exists due to halogenides (Cl, Br, I) in the ink. The ink, once filled into the writing head, must exhibit a satisfactory shelf life, it must not react with the coating material covering the nozzles, and it must not be subject to attack by microorganisms. Various inks were found to be prone to frothing due to dye particle accumulations at the interfaces of writing head material and ink, and air and ink, leading to the failure of individual systems of the writing head.

Satisfactory legibility of type characters and symbols on the print carrier requires not only uniform droplets but also uniform droplet deposition on the print carrier. Ink spreading on the print carrier, especially in the fiber direction, substantially impairs the printed image which cannot be corrected by an increase in the fineness of the grid pattern. Additional parameters for a satisfactory ink are its adaptability to the selected print carrier and its lightfastness, resistance to smearing and resistance to forgery.

German Unexamined Laid-Open Application DOS 2,132,324 discloses an aqueous writing ink fed under slight hydrostatic pressure to the writing pen of a writing implement. The writing ink contains, in addition to water as primary ingredient, smaller amounts of a water-soluble lower alkyl ether of ethylene or diethylene glycol, water-soluble dyes, and a water-soluble resin from the group of polyvinylpyrrolidone and polyethylene oxides. An amine is employed to adjust the pH value and neutralize the acidic additives. Due to the presence of the alkyl-ether compound, the surface tension of the ink is so greatly reduced, that the formation of droplets during the ejection of the ink from writing heads of the type mentioned above is impossible. Moreover, during periods of long inactivity, a tough film forms in the outlet aperture of each nozzle, instead of the required liquid meniscus, and this film cannot even be penetrated by the impulses from a compression system with a ceramic vibrator. This ink is unsuitable for use in ink ejection printing processes.

Inks are disclosed in DOS No. 2,160,475 for use in jet printing processes. One or more water-soluble dyes are utilized therein along with a moisturizing system based on a mixture of lower alkoxy triglycols which does not adversely affect the viscosity in spite of water loss from the ink. However, the alkoxy glycols lead to a strong reduction of the surface tension and, as in case of the above-discussed ink, carbon dioxide is absorbed to a large extent from the atmosphere, whereby the pH value of the ink is lowered, which, when using organic dyes, can result in the precipitation of deposits.

U.S. Pat. No. 3,705,045 describes the use and suitability of triarylmethane dyes in inks. Additives to the ink, such as glycols, are employed for avoiding crystallization deposits, based on the assumption that mixtures of alkaline and acidic dyes produce precipitates which can be dissolved only with difficulty. The disclosed process is restricted to the described specific classes of dyes and very accurate mixing ratios must be maintained.

U.S. Pat. No. 1,787,233 describes the use of citric acid as an ink additive, primarily to lower the freezing point of the mixture. Because the pH of the ink ranges at values aroung 1, the ink is unsuitable for use in writing heads, especially metal writing heads.

It is further known to use moisturing agents, e.g., glycerin, in commercially available aqueous inks to retard drying. However, this additive increases the viscosity and the color intensity of the ink is adequate at best. The pH value of such inks is 1.8, as compared with a pH value of about 6, which is the advantageous value for a writing method described hereinabove.

In order to avoid drying, moisturizing agents, such as glycerin, for example, are conventionally added to commericially available water-based inks. Such additives, however, increase viscosity. The color intensity of such inks is adequate at most and their pH is about 1.8, which is substantially below the range suitable for the above-described ejection printing processes.

In addition, German Patent No. 2,511,902, corresponding to U.S. Ser. No. 667,378, filed Mar. 16, 1978, now U.S. Pat. No. 4,101,329, an aqueous ink for an ink ejection process, particularly a blue ink. The ink comprises a water-soluble triphenyl methane dye and a buffer mixture of an organic hydroxy, containing carboxylic acid and a water-soluble amine.

SUMMARY OF THE INVENTION

It is a primary object of the present invention to provide an aqueous ink, particularly a black ink, for use in a writing process wherein the ink is transferred in droplets onto a print carrier.

Another object is to provide processes for the production of such inks and the use thereof in ink ejection printing processes.

Additional objects and advantages of the present invention will be set forth in part in the description which follows and in part will be obvious from the description or can be learned by practice of the invention. The objects and advantages are achieved by means of the processes, compositions and combinations particularly pointed out in the appended claims.

To achieve the foregoing objects and in accordance with its purpose, the present invention, as embodied and described, provides an aqueous black ink for a writing process in which ink is transferred in droplets onto a print carrier, comprising 25–42 g./l. of the direct dye Diamine Blue 6B, extra high concentration; 14–22 g./l. of the direct dye Diamine Scarlet 4BS, extra concentration; 290–430 ml./l. of formamide; 32–48 ml./l. of 90% diethanolamine, 24–60 g./l. of citric acid, a water-soluble and organic-soluble disinfectant, and balance essentially water.

The ink of the present invention comprises a novel combination of substrates and additives which collaborate, especially in the combination of the water-soluble direct dyes, to provide an aqueous black ink which can be successfully transferred in droplets onto a print carrier. The manufacture and storage of the ink of the present invention is without problems. The selection of the two non-black direct dyes used in the present invention results in the formation of a true solution with the solvent, i.e., the dyes are not present in colloidal form. The solvent system is capable of absorbing the dyes in their entirety and prevents any crystallization from taking place. In the present invention, formamide is the organic solvent into which the dyes are dissolved and it acts as a moisturizing agent.

The use of diethanolamine and citric acid in the ink results in a stabilization of the ink with respect to its viscosity. With such a combination, water, e.g. atmospheric moisture, is absorbed into the ink. Further, the dyes are prevented from crystallizing, and corrosion of the writing head by the ink is avoided.

In another aspect of the present invention, there is provided a process for producing such an ink which comprises the sequential steps of: mixing both dyes together; introducing the mixture at room temperature in incremental portions into the formamide which is agitated by constant stirring; constantly further stirring the thus-obtained mixture until the dyes are substantially completely dissolved; removing undissolved salts from the mixture, such as by filtering through a coarse filter; introducing diethanolamine and distilled water under agitation into the mixture; adjusting the mixture to a pH of about 6 to 8 with citric acid; thereafter adding disinfectant under agitation to the mixture; then filtering the mixture under vacuum through a fine filter, and withdrawing gases from the mixture by treating the mixture under a vacuum.

In the process of the present invention, the direct dyes contain salts, e.g., sodium sulfate and sodium carbonate which are not dissolved in the formamide, and therefore are removed, after dissolving the dyes in the formamide, at the beginning of the process by such means as filtration or decanting. The vacuum-filtering step which follows the pH adjustment and addition of disinfectant represents a preliminary degasification which is then followed by a further degasification treatment.

DETAILED DESCRIPTION OF THE INVENTION

The aqueous ink of the present invention contains a mixture of water soluble red and blue direct dyes. The ink transfered at a writing-paper imparts a black impression.

The mixture of the two direct dyes used in the present invention has been found, in spite of the knowledge that long chains are present in black direct dyes, to be suitable for use in aqueous inks adapted for ink writing methods in which ink is transferred in droplets onto a print carrier. These direct dyes form a true solution with formamide and, in conjunction with the other components of the novel ink, form droplets which are transferred satisfactorily to the print carrier and which penetrates therein substantially perpendicularly to the writing plane.

The direct dye Diamine Blue 6B, (C.I. Direct Blue 15-C.I., 24400) extra high concentration, and direct dye Diamine Scarlet 4 BS, (C.I. Direct Red 23-C.I. 29160) extra concentration, are both sold by Farbweke Hoechst AG, Frankfurt, Federal Republic of Germany. The selected direct dyestuffs are those which form a true solution in the ink, i.e., so they are not present in colloidal form. The solvent system is able to maintain the dyestuffs in solution without any crystallization occuring.

The ink of the present invention contains a disinfectant which maintains it free of microorganism growth and which does not significantly affect the flow and printing properties of the ink. A disinfectant which can be used have the formulation 6-Acetoxy-2,4-dimethyl-m-dioxan and the following general formula:

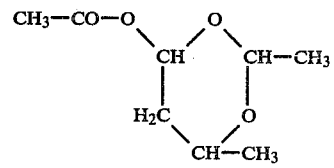

In the process for producing an ink of this invention, both dyes are mixed together and the mixture is introduced at room temperature in small portions into the formamide while the latter is agitated by constant stirring. The thus-obtained mixture is thereafter further stirred constantly, e.g., for about 15 minutes. The mixture is then treated to remove undissolved salts, as by filtering through a coarse filter, and diethanolamine and distilled water are then introduced into the mixture under agitation. The pH of the solution is brought to about 6 to 8 with citric acid, the exact pH depending on the type of steel used for the printing head of the writing instrument. Thus, when the steel is a highly corrosion resistant steel, such as stainless steel, the pH is set to about 6. When the steel is a less corrosion steel, the pH is set to about 8. Thereafter, a disinfectant is added. When the steel for the writing head is of the less corrosion resistant type, a water-miscible, non-crystallizable corrosion inhibitor, preferably an alkanolamine salt of a nitrogen-containing condensation product is added to the mixture, generally in an amount of about 0.2–2.0% by weight of the ink. The mixture is then fine filtered, e.g., under vacuum through an 0.6μ membrane filter and gases are withdrawn from the mixture by holding the solution under vacuum, e.g., for about 20 minutes.

The following example is given by way of illustration to further explain the principles of the invention. This example is merely illustrative and is not to be understood as limiting the scope and underlying principles of the invention in any way. All percentages referred to herein are by weight unless otherwise indicated.

EXAMPLE

A mixture of 34 g. of direct dye Diamine Blue 6B, extra high concentration, and 18 g. of Diamine Genuine Scarlet 4BS, extra concentration (both obtained from Hoechst, Frankfurt, Federal Republic of Germany) is introduced with constant mixing and in incremental portions, to prevent lump formation, into 360 ml. of formamide at room temperature during a 10 minute period.

The mixture is then stirred for about 15 minutes. The dystuffs are substantially completely dissolved, but not necessarily foreign salts, such as sodium sulfate or sodium carbonate formed during the production of the dyestuff or added subsequently. These undissolved salts are removed, e.g., by coarse filtration using a folded filter, fibrous mat, or similar devices, or by simple decanting. Then 90 ml. of 90% strength diethanolamine and distilled water in an amount which brings the volume to about 1,000 ml. are added with stirring. The pH is then adjusted to about 6 with 24–60 g. of citric acid.

The amounts of dyestuffs, formamide, and diethanolamine can be varied about ±20%, depending on which of the properties, e.g., color intensity, viscosity, surface tension, penetrating capacity into the print carrier, drying behavior, and the like, is to be emphasized in the ink.

After adjusting pH, a disinfectant sold under the trade name GIV GARD-DXN is added to destroy and prevent contamination by microorganisms. This disinfectant is soluble both in water and in organic substrates, is highly effective, and affects the required ink properties only insignificantly. The disinfectant is added to the mixture, generally in an amount of about 0.2% by weight of the ink. The manufacturer of GIVGARD-DXN is the GIVAUDAN S.A., Vernier, Genf, Schweiz.

After introduction of the disinfectant, the ink is filtered under vacuum through a 0.6μ membrane filter and then degasified for about 20 minutes under vacuum.

The thus-produced ink penetrates more or less rapidly into most of the conventional types of paper, and the dyes combine with the paper fiber to an even depth. Such a written image cannot be removed by water, acids, alkalis or organic solvents without total destruction of the paper structure, and thus can be considered to be forgery-proof.

To permit the ink to be used in printing heads formed of steels of a moderately alloyed character and which are less corrosion resistant than, for example, stainless steel, the pH of the ink is adjusted to an alkaline value of about 8, instead of about 6. A corrosion inhibitor sold by Hoechst AG., Frankfurt/Main under the trade name of "Hostacor KS 1" and which consists essentially of an alkanolamine salt of a nitrogen-containing condensation product, and which has heretofore been used in the metal-cutting art as a coolant and lubricant additive, is added in an amount of 0.2–2.0% by weight of the ink, which preventative is miscible with an aqueous solution and does not have a tendency to crystallize. The corrosion inhibitor preferably is added after the disinfectant and before the vacuum filtering. Another corrosion inhibitor which can be used is sold by Schilling Chemie GmbH and Produktions K.G., Freiberg, Germany under the trade name of "VARIDOS GS." This corrosion inhibitor consists essentially of benzoat, borate, nitrite and polycarbon acid. This corrosion inhibitor can be added in an amount of 0.5–1.5% by weight of ink.

It will be understood that the above description of the present invention is susceptible to various modifications, changes and adaptations, and the same are intended to be comprehended within the meaning and range of equivalents of the appended claims.

What is claimed is:

1. Aqueous black ink for a writing process wherein ink is transferred in droplets onto a print carrier comprising: 25–42 g./l. of the direct dye Diamine Blue 6B, extra high concentration; 14–22 g./l. of the direct dye Diamine Scarlet 4BS, extra concentration; 290–430 ml./l. of formamide; 32–48 ml./l. of 90% diethanolamine, 24–60 g./l. of citric acid; a water-soluble and organic-soluble disinfectant; and balance essentially water.

2. The aqueous ink as defined in claim 1, wherein the pH of the ink is about 6 to 8.

3. The aqueous ink as defined in claim 1, wherein the ink contains a corrosion inhibitor.

4. The aqueous ink as defined in claim 1, wherein the water is distilled water.

5. Process for producing the ink according to claim 1, comprising the sequential steps of: mixing both dyes together; introducing the mixture at room temperature in incremental portions into the formamide, which is agitated by constant stirring; constantly further stirring the thus-obtained mixture until the dyes are substantially completely dissolved; removing undissolved salts from the mixture; introducing diethanolamine and distilled water under agitation into the mixture; adjusting the pH to about 6 to 8 with citric acid; thereafter adding disinfectant under agitation to the mixture; filtering the mixture under vacuum through a fine filter; and withdrawing gases from the mixture by treating the mixture under a vacuum.

6. Process according to claim 5, wherein the pH is adjusted to about 6.

7. Process according to claim 5, wherein the pH is adjusted to about 8 with the citric acid, and after addition of the disinfectant and before the filtering under vacuum, adding a water-miscible, non-crystallizable corrosion inhibitor, consisting essentially of an alkanolamine salt of a nitrogen-containing condensation product, in an amount of 0.2–2.0% by weight of the ink.

8. Process according to claim 5, wherein the constant further stirring is for about 15 minutes.

9. Process according to claim 5, wherein the removing of undissolved salts is achieved by filtering the mixture.

10. Process according to claim 5, wherein the withdrawing of gases under vacuum is for about 20 minutes.

11. Process according to claim 5, wherein the fine filter is a 0.6μ membrane filter.

12. Process according to claim 9, wherein a coarse filter is used to remove the undissolved salts.

* * * * *